US011516582B1

(12) United States Patent
Dhanapalan et al.

(10) Patent No.: US 11,516,582 B1
(45) Date of Patent: Nov. 29, 2022

(54) SPLITTING FREQUENCY-DOMAIN PROCESSING BETWEEN MULTIPLE DSP CORES

(71) Applicant: Amazon Technologies, Inc., Seattle, WA (US)

(72) Inventors: Ajay Kumar Dhanapalan, San Jose, CA (US); Nicola Zandona, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 17 days.

(21) Appl. No.: 17/154,055

(22) Filed: Jan. 21, 2021

(51) Int. Cl.
*H04R 3/04* (2006.01)
*G10L 19/008* (2013.01)
*H04S 3/00* (2006.01)
*H04R 3/00* (2006.01)

(52) U.S. Cl.
CPC .............. *H04R 3/04* (2013.01); *G10L 19/008* (2013.01); *H04R 3/005* (2013.01); *H04S 3/008* (2013.01); *H04S 2400/01* (2013.01)

(58) Field of Classification Search
CPC ....... G10L 2021/02165; G10L 21/0232; G10L 2021/02166; G10L 19/0204; G10L 25/78; G10L 2021/02082; H04R 3/005; H04R 1/1083; H04R 2410/05; G10K 11/17854; G10K 11/17823; G10K 11/17881; G10K 11/17883
USPC .......................... 381/71.12, 71.14, 94.3, 94.7
See application file for complete search history.

(56) References Cited

U.S. PATENT DOCUMENTS

| | | | | |
|---|---|---|---|---|
| 6,081,783 A | * | 6/2000 | Divine | H03M 7/30 704/201 |
| 7,006,555 B1 | * | 2/2006 | Srinivasan | H04H 20/31 380/42 |
| 8,532,171 B1 | * | 9/2013 | Narayanan | H04N 21/21805 375/240.01 |
| 2019/0355334 A1 | * | 11/2019 | Lin | H03M 13/09 |
| 2020/0027465 A1 | * | 1/2020 | Lin | G06F 16/60 |
| 2021/0390952 A1 | * | 12/2021 | Masnadi-Shirazi | G10L 21/0208 |
| 2022/0103952 A1 | * | 3/2022 | Riemer | G06F 3/165 |

* cited by examiner

*Primary Examiner* — Alexander Krzystan
(74) *Attorney, Agent, or Firm* — Pierce Atwood LLP

(57) ABSTRACT

An audio processing system may split frequency-domain processing between multiple DSP cores. Processing multi-channel audio data—e.g., from devices with multiple speakers—may require more computing power than available on a single DSP core. Such processing typically occurs in the frequency domain; DSP cores, however, typically communicate via ports configured for transferring data in the time-domain. Converting frequency-domain data into the time domain for transfer requires additional resources and introduces lag. Furthermore, transferring frequency-domain data may result in scheduling issues due to a mismatch between buffer size, bit rate, and the size of the frequency-domain data chunks transferred. However, the buffer size and bit rate may be artificially configured to transfer a chunk of frequency-domain data corresponding to a delay in the communication mechanism used by the DSP cores. In this manner, frequency-domain data can be transferred with a proper periodicity.

22 Claims, 7 Drawing Sheets

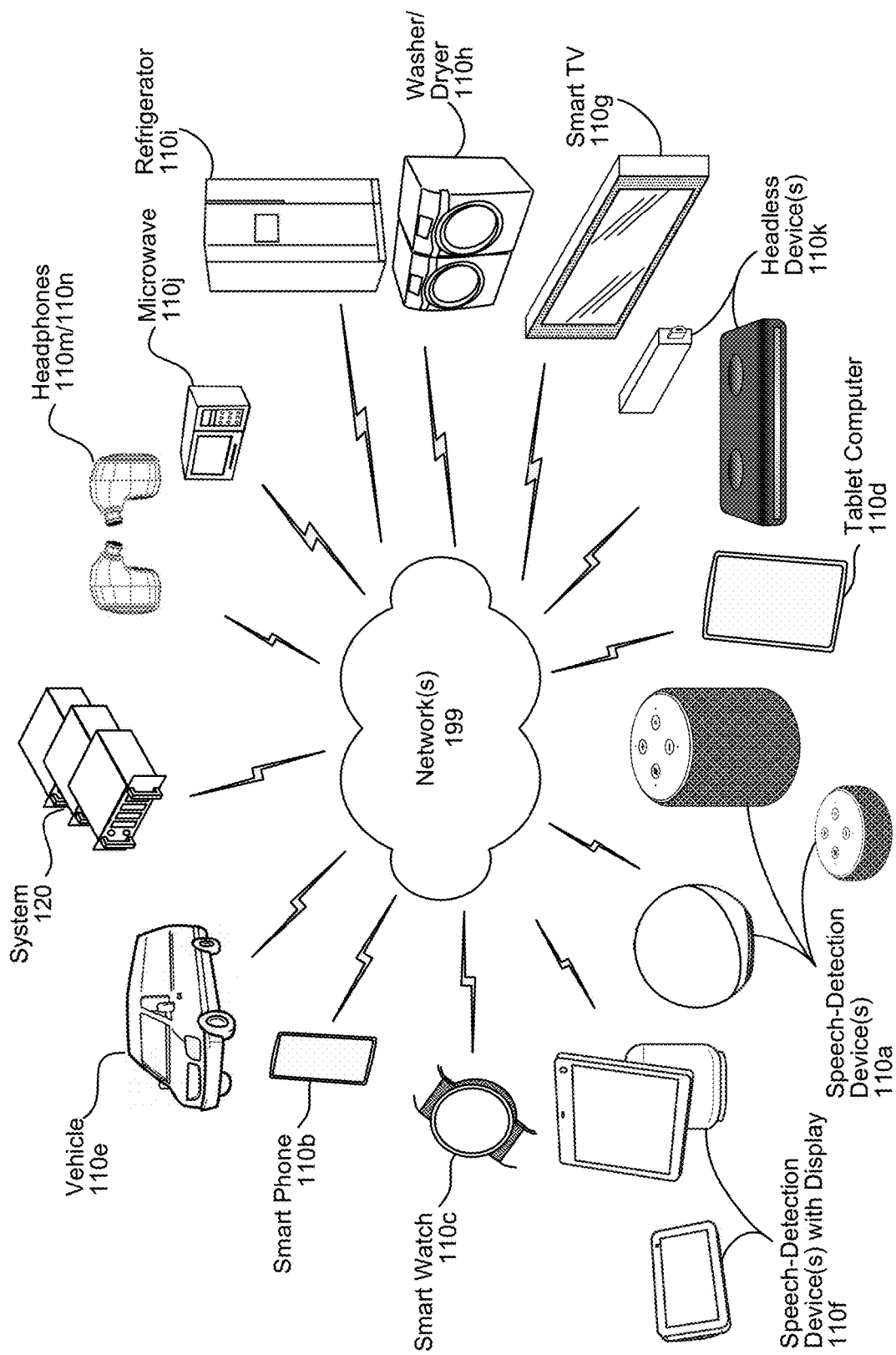

US 11,516,582 B1

SPLITTING FREQUENCY-DOMAIN PROCESSING BETWEEN MULTIPLE DSP CORES

BACKGROUND

With the advancement of technology, the use and popularity of electronic devices has increased considerably. Electronic devices are commonly used to capture and process audio data.

BRIEF DESCRIPTION OF DRAWINGS

For a more complete understanding of the present disclosure, reference is now made to the following description taken in conjunction with the accompanying drawings.

FIG. 7 illustrates an example of a computer network for use with the overall system, according to embodiments of the present disclosure.

DETAILED DESCRIPTION

Figure 1:
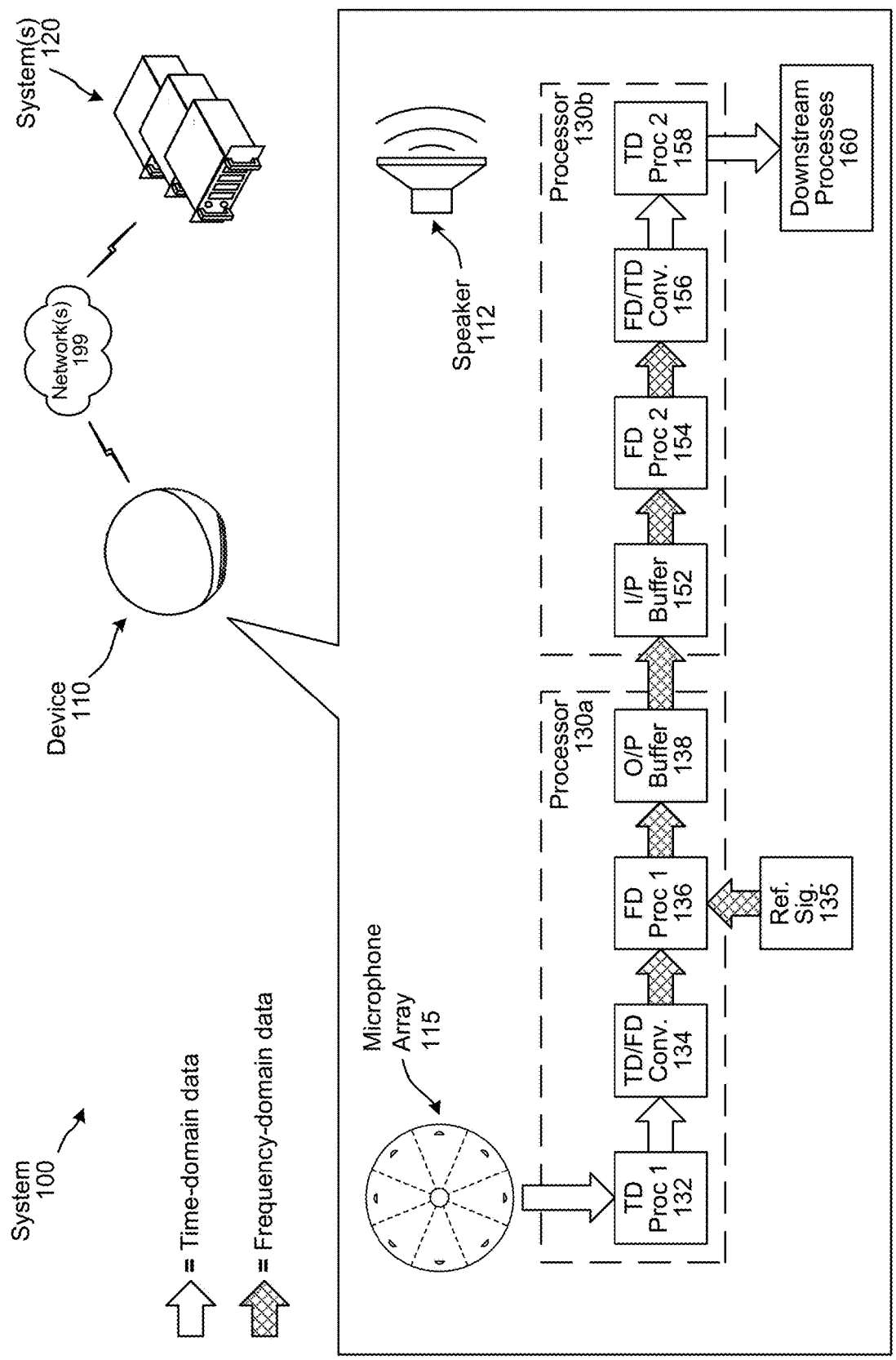
FIG. 1 is a block diagram illustrating components of a system for splitting frequency-domain processing between multiple processors, according to embodiments of the present disclosure.

Electronic devices may be used to capture audio and process audio data. The audio data may be used for voice commands and/or sent to a remote device as part of a communication session. To process voice commands from a particular user or to send audio data that only corresponds to the particular user, the device may attempt to isolate desired speech associated with the user from undesired speech associated with other users and/or other sources of noise, such as audio generated by loudspeaker(s) or ambient noise in an environment around the device. In some examples, loudspeakers may generate audio using playback audio data while a microphone generates local audio data. An electronic device may perform audio processing, such as acoustic echo cancellation (AEC), adaptive interference cancellation (AIC), and/or the like, to remove an "echo" signal corresponding to the playback audio data from the local audio data, isolating local speech to be used for voice commands and/or the communication session. In addition, the device may perform sound source localization to distinguish between multiple sound sources represented in the audio data.

Audio processing may be performed on one or more processors, such as digital signal processors (DSPs). Processors, such as DSPs, have a finite amount of processing power available. Processing multi-channel audio, such as on or from a device with multiple speakers, may exceed the processing power of a single DSP. Audio processing may be split between two or more DSP cores; however, while most audio processing occurs in the frequency domain, existing frameworks for connecting DSPs are configured for transferring time-domain data. Thus, to use such frameworks, a first DSP core may convert the audio data back into time-domain data and transfer it to a second DSP core, which may convert the audio data back into the frequency domain. The extra conversions consume additional processing power and introduce lag.

If frequency-domain data is communicated between DSP cores using existing time-domain frameworks, however, the second DSP core may not receive and process the data with the correct periodicity. The second DSP core may be scheduled to process data only when the input buffer of the receiving port is full. The receiving port may be configured according to time-domain parameters, such as number of channels, sample, rate, frame duration, and sample width. But because the frequency domain data may not conform to the expected size and periodicity of the receiving buffer, the second DSP core may not begin processing until it receives multiple chunks of data from the first DSP core. Because the communication mechanism between the DSP cores may introduce a delay, each chunk of data received by the second DSP core and not processed for lack of filling the input buffer may introduce an additional delay in the processing.

To transfer frequency-domain data while maintaining the desired scheduling, the time-domain parameters of the DSP ports may be configured to send and receive data in chunks sized appropriately for the delay caused by the communication mechanism. For example, the communication mechanism may be an inter-process communication (IPC) mechanism, which may introduce a fixed delay of 8 milliseconds. A buffer size of the input and output buffers may be configured to hold an amount of frequency-domain data corresponding to an audio frame 8 milliseconds long. A bit rate of the link may be configured to transfer an amount of data equal to or greater than the buffer size within that 8 millisecond window. Thus, the system will transfer and then process the data at each communication cycle, and at a rate commensurate with the rate at which the system receives the audio data. The bit rate, however, will be artificial in that it does not correspond to time-domain data; i.e., it does not conform to a sample rate of time-domain audio data. However, by configuring the buffer sizes and bit rate in this way, the DSP cores can be scheduled such that the first DSP core transfers a chunk of frequency-domain data corresponding to a frame of audio data, and the second DSP core begins processing the data when it is received and without waiting for additional data.

FIG. 1 is a block diagram illustrating components of a system 100 for splitting frequency-domain processing between multiple processors, according to embodiments of the present disclosure. The system 100 can reside in whole or in part on a device 110. The device 110 may be one capable of receiving and execute commands delivered by a user in the form of spoken and/or text natural language, in some cases with assistance of a back-end natural language command processing system 120 connected via a computer network 199. The device 110 may include a microphone or microphone array 115 for receiving spoken commands and/or ambient audio, and a speaker 112 for outputting streaming audio, voice over internet protocol (VoIP), text-to-speech (TTS), etc. The device 110 may include one or more processors such as a processor 130a and processor 130b (collectively "processors 130"). As used herein, a processor 130 may refer to a single-core processor in an integrated circuit (IC) package or an individual processor core within a multi-core IC package. In some implementations, a processor 130 may be a digital signal processor (DSP) in an IC package, or a DSP core in a multi-core IC package, which may or may not include one or more central processing unit (CPU) cores and/or general purpose processor cores. Communication between a first processor 130a and a second processor 130b may include communication between respective processors or cores residing in the same or different IC packages. The communication methods discussed herein may also apply to transferring data between respective processes or threads executing on a single core. The processors 130 may receive input audio data from the microphone array 115, and provide output audio data to the speaker 112. Additional features and examples of the device 110 and the system 120 are described below with reference to FIGS. 5-7.

The processors 130 may perform the functions of and audio front end (AFE); for example, converting time-domain audio data to/from frequency domain audio data and performing signal processing operations such as sub-band analysis, echo cancelation, beamforming, adaptive interference cancellation, and the like. In some cases, the processing the audio may require more computing power than available on a single processor or processor core. In such cases, the processing may be divided between two or more processors or cores. In the system 100, audio processing operations have been divided between the processor 130a and the processor 130b. The processor 130a may perform AFE pre-processing, and the processor 130b may perform AFE post-processing. The output of the AFE pre- and post-processing may be provided to downstream processes 160 such as wakeword detection, automatic speech recognition (ASR), voice over internet protocol (VOIP), and/or a data capture process (e.g., for recording). The downstream processes 160 may be performed on the processor 130b, on a different processor or core, and/or in the system 120.

In an example operation, the first processor 130a may receive audio data from the microphone array 115 by way of an analog-to-digital convertor that converts an analog audio signal into a time-domain, digital audio format, such as a pulse-code modulation (PCM) stream. Other time-domain audio formats include waveform audio file format (WAV), audio interchange file format (AIFF), MP3, etc. The audio data may be a single channel or multi-channel audio; for example, individual audio channels corresponding to respective microphones of the microphone array 115. The processor 130a may include a first time-domain processing block 132. As used herein, a "block" may include one or more software entities having defined a defined input port and output port. A block may execute on a general and/or specialized processing logic such as in a DSP and/or CPU. The first time-domain processing may include, for example, filtering such as high-pass filtering to remove low frequencies and/or direct current (DC) from the audio data. Other types of time-domain processing may include microphone calibration; that is, normalizing microphone inputs with respect to each other. A time-domain to frequency-domain convertor 134 may convert the time-domain audio data into frequency-domain data. The processor 130a may perform some processing on the frequency-domain data with, for example, a first frequency-domain processing block 136. The first frequency-domain processing block 136 may perform frequency-domain processing on the audio data such as echo cancelation (with or without the benefit of a reference signal 135 representing audio being output by the speaker 112), beamforming, and/or noise or interference reduction.

If the frequency-domain processing requires more computing power than is available on a single processor 130a, some of the frequency-domain processing may be performed by the second processor 130b. Processors typically communicate via ports configured for transferring time-domain data. For example, the ports may communicate using asynchronous IPC. IPC is a mechanism which allows processes (either on the same or different processors or processor cores) to communicate with each other and synchronize actions. Communicating via IPC may introduce a delay; accordingly, communication parameters may relate to transferring time-domain data in chunks that correspond to a duration of the delay. For example, the ports may be configured with settings such as sample rate, sample width, frame duration, number of channels, etc. These parameters allow for scheduling of the two processes to happen with the correct periodicity; for example, by transferring 8 milliseconds worth of time-domain audio data at a time for a delay of 8 milliseconds. But because the frequency-domain data will not be the same size, and in fact may be a fraction of the size of time-domain data representing the same duration of audio, transferring a single chunk of the frequency-domain data may not fill an input buffer of the receiving port. If the input buffer is not full after the transfer, the second processor 130b may not begin processing the data. It may take several more transfers to fill the buffer and cause the second processor 130b to begin processing; however, the wait may introduce a lag of several times the delay of the communication mechanism. Alternatively, the frequency-domain data could be converted back to time-domain data on the first processor 130a, transferred to the second processor 130b, and converted back into frequency-domain data for further frequency-domain processing. The extra conversion steps will introduce additional lag, however, as well as consume additional resources of the already taxed processors 130.

One solution is to set a buffer size of the output buffer 138 of the first processor 130a and the input buffer 152 of the second processor 130b. The buffer sizes can be set to equal the size of frequency-domain data corresponding to a frame of received audio data. A frame size—that is, a frame duration—of the received audio data can be set to the duration of the communication delay. In this manner, a chunk of frequency-domain data corresponding to the audio frame may be stored in the input buffer 152 and transferred for each communication cycle. For example, the buffer size can be set according to the formula expressed in Equation 1:

$$b = \frac{ch \cdot ss \cdot sr \cdot fs}{1{,}000{,}000} \tag{Eq. 1}$$

Where:
  b is the buffer size in bytes
  ch is the number of channels
  ss is the sample size
  sr is the sample rate in bits/s
  fs is the frame size in microseconds In other words, the buffer size may be equal a product of: the number of audio channels, the sample size, the sample rate, and the frame size (e.g., the duration of time represented by audio data the frame). The formula may be reversed to determine an equivalent link rate as expressed in Equation 2:

$$sr = \frac{b \cdot 1{,}000{,}000}{ss \cdot ch \cdot fs} \qquad \text{(Eq. 2)}$$

Where sr is the sample rate; i.e., the link rate.

In other words, the link rate may be equal to (or, in some cases, greater than) the first buffer size divided by a product of: the sample size, the number of audio channels, and the frame size. Thus, the bit rate of the communication link may be set to allow the data chunk corresponding to an audio frame to be transferred in the given amount of time; for example, the duration of the communication mechanism delay. Thus, the second processor 130*b* will read the data from the input buffer 152 with the correct periodicity; that is, the second processor 130*b* will read the buffer for each chunk of data that is sent. Timing of processing and data transfer operations are described in additional below with reference to FIG. 3.

In an example implementation, the system 100 may be collecting audio from 8 microphones (i.e., 8 channels) at a 16 kHz sample rate and a 32-bit sample size. The AFE pre-processing may generate frequency-domain data with 129 sub-bands times 8 channels, with real and imaginary parts (2 dimensions) with a sample size of 4 bytes (ss=4 for 32-bit samples). Thus, a frequency-domain audio data chunk size corresponding to one frame of audio may be:

128·8·4·2=8,256 bytes

Accordingly, 8,256 bytes may be transferred for each frame (i.e., once every "frame duration" in milliseconds). The buffer size may thus be set to 8,256 bytes. Using Equation 2, the link rate ("sr") may be found based on the buffer size, the sample size (4 bytes), the number of channels (1 channel), and the frame size (8 milliseconds=8,000 microseconds) as expressed in Equation 3:

$$sr = \frac{b \cdot 1{,}000{,}000}{ss \cdot ch \cdot fs} = \frac{8{,}256 \cdot 1{,}000{,}000}{4 \cdot 1 \cdot 8{,}000} = 258{,}000 \text{ bits/sec} \qquad \text{(Eq. 3)}$$

This represents an artificial increase in the link rate used to configure the ports to transfer all channels of the frequency-domain audio data through one channel of the link with the correct periodicity relative to the communication delay.

Figure 2:
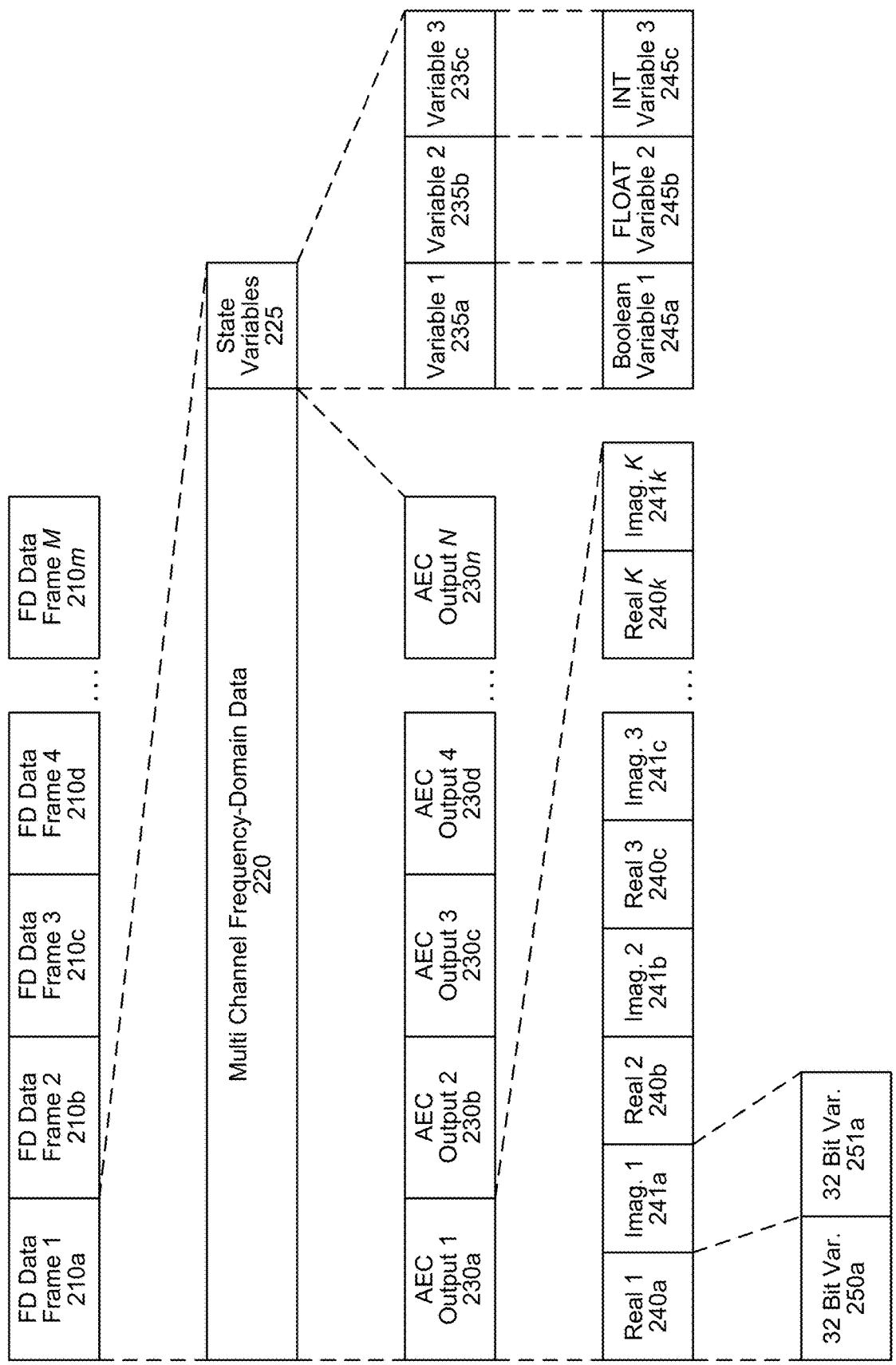
FIG. 2 is a diagram illustrating contents of a frame of frequency-domain data passed between DSP cores, according to embodiments of the present disclosure.

FIG. 2 is a diagram illustrating contents of a frame of frequency-domain data passed between processors 130 or processor cores, according to embodiments of the present disclosure. The frequency-domain data is made up of frames 210*a*, 210*b*, 210*c*, 210*d*, . . . 210*m*. A transfer operation between the processors 130 may convey a single frame 210. A frame 210 may include multi-channel frequency-domain data 220 and, in some implementations, one or more state variables 225. The state variables 225 may include a first state variable 235*a*, a second state variable 235*b*, and a third state variable 235*c*, etc. A state variable may be a Boolean variable 245*a*, a floating point number ("FLOAT") 245*b*, or integer ("INT") 245*c*. An example Boolean variable 245*a* may be a flag that states that the AFE pre-processing includes processing one or more channels of reference data representing audio output by the device 110. Another example Boolean variable 245*a* may indicate the presence of an ultrasonic detection signal in the microphone data, where the detection signal may be outside the range of human hearing and may thus not be preserved through time domain to frequency domain conversion or other processing. An example FLOAT variable 245*b* may indicate a level (e.g., in decibels) of the reference signal, where a relatively low level may indicate that the device may be outputting only a very low sound pressure level of the reference signal. An INT variable 245*c* could also be used to convey the reference signal level. AFE post-processing may take this state variable 235 when, for example, performing an adaptive reference algorithm (ARA). The multi-channel frequency-domain data 220 may include one or more channels of output from audio echo cancelation (AEC) processing: AEC output 230*a*, 230*b*, 230*c*, 230*d*, . . . 230*n* for N channels of audio corresponding to N microphones. An AEC outputs 230 may have components representing K sub-bands (e.g., 128 bands plus a DC band as in the example above), where each sub-band has a real part 240 and an imaginary part 241. The first real part 240*a* includes a 32-bit variable 250*a*, and the first imaginary part 241*a* may include a 32-bit variable 251*a*.

Note that all (or a portion) of the data included in the frequency-domain data frame 210, including the state variables 225, may be taken into account when calculating buffer sizes and link rates using the formulas above.

Returning to FIG. 1, the input buffer 152 receives the data and, when full, the second processor 130*b* passes the frequency-domain data to a second frequency-domain processing block 154. The second frequency-domain processing block 154 may continue processing of the audio data begun in the first frequency-domain processing block 136. For example, the second frequency-domain processing block 154 may include beamforming, beam selecting, ARA, AIC, beam merging, etc. Following the second frequency-domain processing, the second processor 130*b* may convert the frequency-domain data back to the time domain at the frequency-domain to time-domain conversion block 156 by performing sub-band synthesis; for example, using an inverse fast-Fourier transform (IFFT) algorithm. The second processor 130*b* may perform one or more time-domain processing operations on the time-domain data with the second time-domain processing block 158; for example, adjusting the output gain to generate time-domain output audio data having a desired amplitude. The resulting data may be passed along to downstream processes 160. The downstream processes 160 may include, for example, wake-word detection and/or ASR. The downstream processes 160 may be performed on the second processor 130*b*, a different processor of the device 110, and/or on the system 120.

Figure 4:
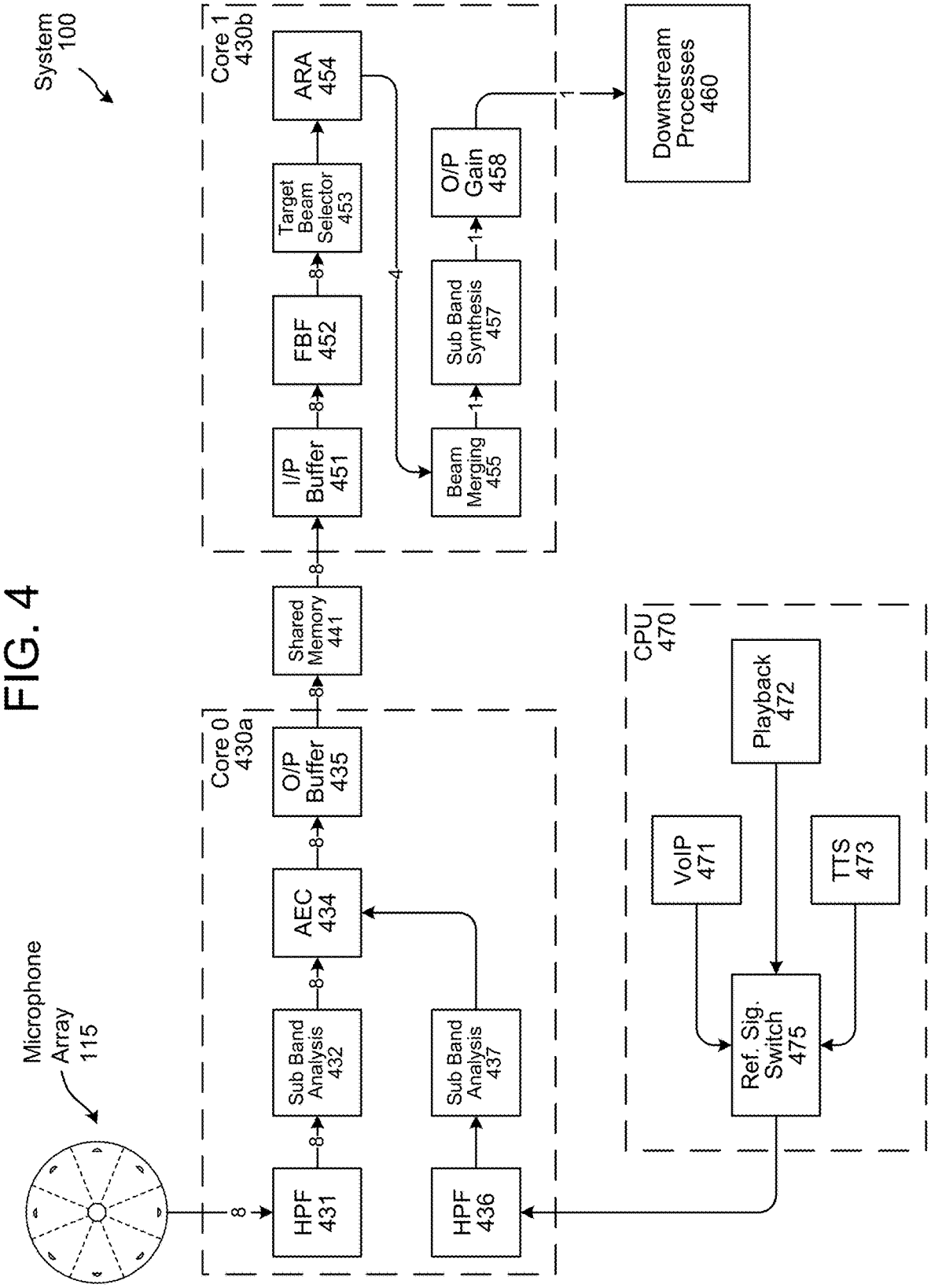
FIG. 4 is a block diagram illustrating an example implementation of a system for splitting frequency-domain processing between multiple DSP cores, according to embodiments of the present disclosure.

The processors 130 may include additional time-domain and frequency-domain processing blocks, and the number and arrangements of the processing blocks shown in FIG. 1 are given only as an example. FIG. 4, discussed below, illustrates another example implementation of a system 100 where frequency-domain processing is split between two processor cores.

Figure 3:
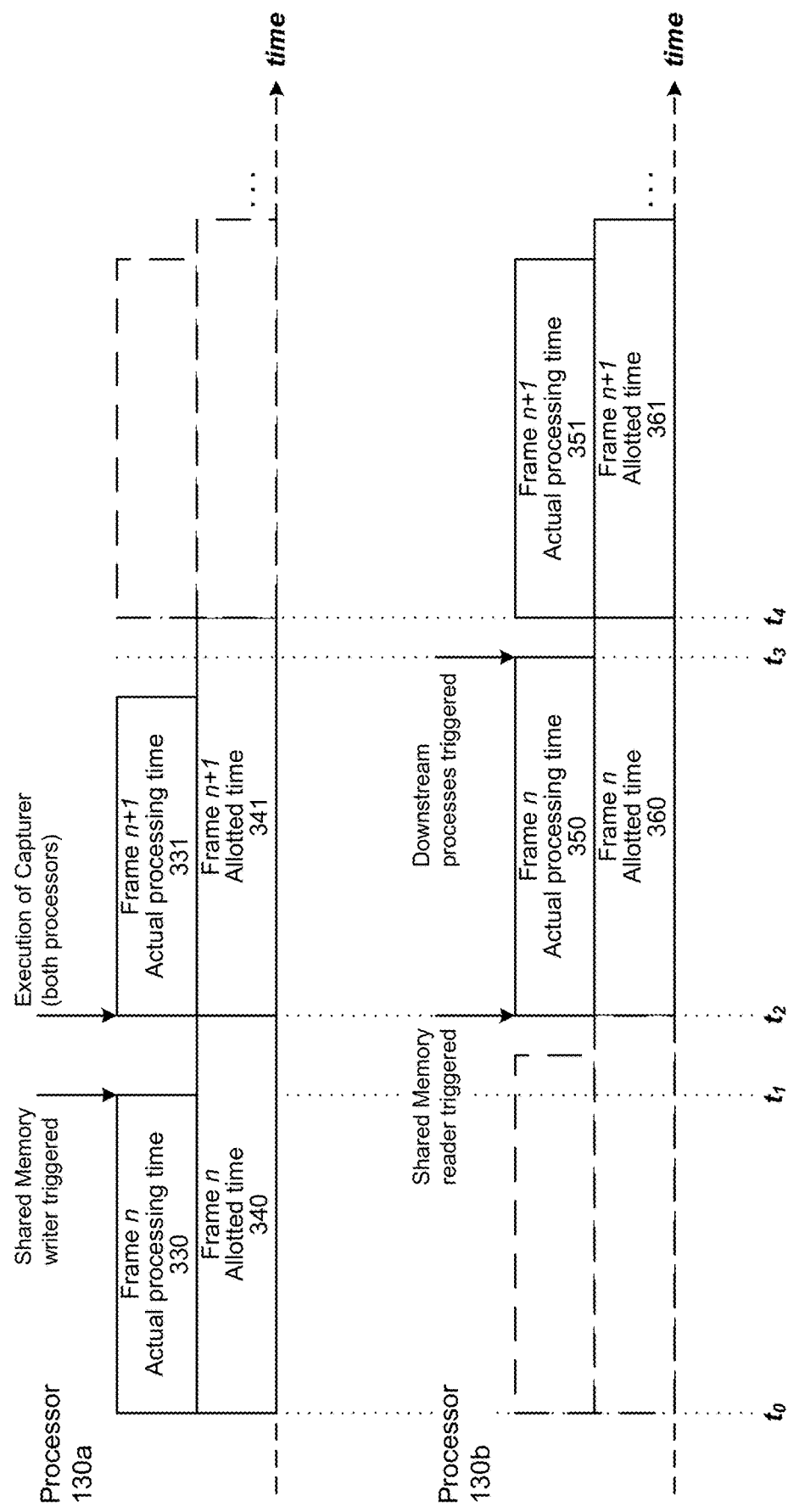
FIG. 3 is a timing diagram illustrating inter-core frame scheduling and events, according to embodiments of the present disclosure.

FIG. 3 is a timing diagram illustrating inter-core frame scheduling and events, according to embodiments of the present disclosure. The processors 130 communicate using an IPC mechanism. IPC mechanisms may be implemented in several ways, including message passing and shared memory. The example in FIG. 3 uses a shared memory mechanism to transfer data from the first processor 130*a* to the second processor 130*b*; however, a similar scheme could implement the transfer according to a message passing mechanism. In addition to the audio processing operations discussed herein, the processors 130 may execute additional software entities for transferring data. For example, a processor 130 may execute a capturer for receiving data and/or a renderer for sending data. The first processor 130*a* may execute one or more capturers for receiving input audio data;

e.g., originating from the microphone and/or a reference signal. The first processor 130a may execute one or more renderers, such as a shared memory writer for transferring data from the output buffer 138 to, for example, a shared memory space for reading by the second processor 130b. The second processor 130b may execute one or more capturers, such as a shared memory reader for transferring data to the input buffer 152 from the shared memory. The second processor 130b may execute one or more renderers, such as one that transfers data to the downstream processes 160.

At a time to, the first processor 130a may receive time-domain data representing a frame n and begin processing. (Also at time to, the second processor 130b may receive frequency-domain data representing a previous frame and being processing.) As described above with reference to FIG. 1, the processing may include time-domain processing, conversion to frequency-domain data, and frequency-domain processing. The first processor 130a may have an allotted time 340—that is, from to $t_0$ a time $t_2$ to process the frame n. The actual processing time 330 for frame n—that is, from to $t_0$ a time $t_1$—may be less than the allotted time 340. At the first processor 130a may complete processing of the frame n data, and indicate that transfer of the frequency-domain data may begin. In the example shown in FIG. 3, the transfer may be initiated by a triggering of a shared memory writer of the first processor 130a. At some time between $t_1$ and a time $t_2$, a shared memory reader of the second processor 130b may be triggered to capture the data written by the shared memory writer of the first processor. The processors 130 may be allotted extra time for processing such that there may be a gap between $t_1$ and $t_2$ to allow for the transfer of data, as each processor 130 may have finished capturing data at $t_2$ so that they may begin processing.

At $t_2$, the first processor 130a may receive and begin processing data from a frame n+1. The first processor 130a may have an allotted time 341 to process frame n+1. The actual processing time 331 for frame n+1 may be less than the allotted time 341. Also at $t_2$, the second processor 130b may begin processing the frequency-domain data received from the first processor 130a at $t_1$. The second processor 130b may an allotted time 360 to process frame n. The actual processing time 350 for frame n—that is, from $t_2$ to a time $t_3$—may be less than the allotted time 360. At $t_3$, the second processor 130b may have completed processing the data, including converting it back to time-domain audio data. The second processor 130b may then trigger downstream processes by, for example, rendering the processed data (e.g., with a second shared memory writer to a second shared memory) and indicating that processed data is ready for capture by other components. At a time $t_4$, the process may continue with the second processor 130b receiving frequency-domain audio data corresponding to frame n+1, and so on.

FIG. 4 is a block diagram illustrating an example implementation of a system 100 for splitting frequency-domain processing between a first DSP core 430a and a second DSP core 430b (collectively, "DSP cores 430"), according to embodiments of the present disclosure. Similar to the example shown in FIG. 1, time-domain audio data is received from a microphone array 115 via an analog-to-digital convertor (not shown). The DSP cores 430 may perform the functions of an AFE, with the first DSP core 430a performing AFE pre-processing and the second DSP core 430b performing AFE post-processing. Frequency-domain audio data may be passed from the first DSP core 430a to the second DSP core 430b via a shared memory 441; however, other mechanisms of communication may be used without departing from the scope of this disclosure. The second DSP core 430b may output time-domain audio data to downstream processes 460 such as wakeword detection, ASR, and/or a VoIP link, which may be performed on one of the DSP cores 430, a CPU 470, and/or a remote system 120.

The CPU 470 may perform other functions of the device 110 including receiving and/or processing VoIP and/or TTS for output by the speaker 112. The CPU 470 may provide a reference signal to the first DSP core 430a for use in AEC processing (and possibly ARA processing). A VoIP block 471 may receive and/or process VoIP from, for example, the remote system 120. Similarly, a playback block 472 may receive and/or process media playback such as streaming audio. A TTS block 473 may receive and/or process TTS; for example, in response to commands sent to a voice-enabled virtual assistant. A reference signal switch 475 may route one or more of the active signals from the VoIP block 471, the playback block 472, and/or the TTS block 473 to the first DSP core 430a.

The first DSP core 430a may perform AFE pre-processing on a multichannel audio signal original from the microphone array 115. The multi-channel audio signal may include 8 channels corresponding to 8 microphones, respectively. In some implementations, the microphone array 115 may include more or fewer microphones and the input audio signal may include more or fewer channels. The first DSP core 430a may receive time-domain audio data and perform filtering with a high-pass filter (HPF) block 431. The HPF block 431 may process time-domain audio data to remove low frequencies and/or DC. The HPF block 431 may send the processed data, still in the form of time-domain audio data, to a sub-band analysis block 432.

The sub-band analysis block 432 may convert the time-domain audio data received from the HPF block 431 into frequency-domain audio data used by the successive audio processing block. In some implementations, the sub-band analysis block 432 may include a uniform discrete Fourier transform (DFT) filterbank to convert the time-domain audio data into the sub-band domain (e.g., converting to the frequency domain and then separating different frequency ranges into a plurality of individual sub-bands). The sub-band analysis block 432 may employ a fast-Fourier transform (FFT) algorithm. The audio signal X may incorporate audio signals corresponding to multiple different microphones as well as different sub-bands (i.e., frequency ranges) as well as different frame indices (i.e., time ranges). The component audio data signals may be represented as Xn(k, m), where n corresponds to the microphone channel, k denotes the sub-band index, and m denotes the frame index. Each component of X may include a real and imaginary part. The combination of all audio signals for all microphones for a particular sub-band index frame index may be represented as X(k,n). The sub-band analysis block 432 may pass the frequency-domain audio data to the AEC block 434.

The AEC block 434 may cancel and/or attenuate echoes of audio emitted from the speaker 112 and received by the microphone 115. In some implementations, the AEC block 434 may perform audio echo cancelation based on the reference signal receive from the CPU 470. The AEC block 434 may determine an estimated echo signal based on the reference signal. The first DSP core 430a may perform similar processing on the reference signal as on the audio signal from the microphone array 115. For example, the reference signal may pass through a second HPF block 436, which may remove low frequencies from the signal. The reference signal may pass through a second sub-band analysis block 437, which may convert the reference signal from a time-domain signal into a frequency-domain signal. The second sub-band analysis block 437 may pass the frequency-domain signal to the AEC block 434 for use in echo cancelation processing.

The AEC block 434 may process the reference signal, synchronize the reference signal with the audio data received from the microphone array 115, apply adaptive filters to the reference signal to generate the estimated echo signal, and remove the estimated echo signal from the audio data. The AEC block 434 may itself comprise a number of internal AEC components, and the number of AEC components may depend on the number of audio channels. In some examples, the device 110 may include an AEC component for each microphone included in the microphone array 115, such that each microphone output is processed by a separate AEC component of the AEC block 434. For example, if the microphone array 115 includes 8 microphones, the AEC block 434 may include eight AEC components. However, the disclosure is not limited thereto and the number of microphones and/or AEC components may vary without departing from the disclosure. Additionally or alternatively, a single AEC component may generate AEC outputs for multiple microphones without departing from the disclosure. In some implementations, the device 110 may process the audio data to compensate for background noise and/or interference without the benefit of a reference signal. In such cases, the AEC block 434 may be replaced or supplemented by an adaptive interference cancelation (AIC) block and/or an adaptive noise cancellation (ANC) block.

Audio echo cancellation may be a resource-intensive process. Thus, AEC processing may occur on the first DSP core 430a, and additional audio processing operations may be performed on the second DSP core 430b. Accordingly, the output of the AEC block 434 may be sent to an output buffer 435. The first DSP core 430a may collect the processed frequency-domain audio data in the output buffer 435 until processing of a frame of data is complete. The first DSP core 430a may then write the data in the output buffer 435 to the shared memory 441. At the beginning of the next processing cycle, the second DSP core 430b will read the data from the shared memory 441 and continue frequency-domain processing. Configuration of the buffers 435 and 451, and the mechanisms of transfer are as described with reference to FIGS. 1 through 3 as described previously.

In the second DSP core 430b, the frequency-domain audio data may be read from the input buffer 451 by a fixed beamformer (FBF) block 452. The FBF block 452 may isolate audio from a desired direction by boosting audio received from the desired direction while dampening audio received from a non-desired direction. For example, an FBF block 452 may include a filter-and-sum structure to boost an audio signal that originates from the desired direction (e.g., look-direction) while largely attenuating audio signals that originate from other directions.

A FBF block 452 may include a number of fixed beamformer units included in the depending on a desired number of beams. For example, to generate twelve beams, the device 110 may include twelve separate fixed beamformer units, with each fixed beamformer unit processing the AEC block 434 outputs to generate an individual beam (e.g., directional output, directional audio signal, beamformed audio data, or the like) corresponding to a particular direction. The FBF block 452 may generate FBF unit outputs, which may correspond to the desired number of beams. Thus, the AEC outputs may be separated into a plurality of audio signals, enabling the device 110 to process audio data associated with a particular direction. The FBF block 452 may provide FBF unit outputs, which may be the same or different in number from the number of microphone channels and/or AEC output channels, to a target beam selector block 453.

The target beam selector block 453 may select one or more target signal beams and/or reference signal beams for use by an adaptive reference algorithm (ARA) executed by the ARA block 454. For example, the target beam selector block 453 may determine a signal quality metric value for each of the FBF unit outputs, may select one or more target signal(s) having highest signal quality metric values, and may select one or more reference signal(s) having lowest signal quality metric values. Thus, the target signal(s) may include one or more directional outputs that are associated with the desired speech, and the reference signal(s) may include one or more directional outputs that are associated with acoustic interference.

In an example operation of the target beam selector block 453, the FBF unit outputs may include twelve different directional outputs (e.g., twelve beams), and the target beam selector block 453 may determine twelve different signal quality metric values, one for each of the directional outputs. Examples of a signal quality metric may include a signal-to-noise ratio (SNR) value, an echo-return loss enhancement (ERLE) value, and/or the like, although the disclosure is not limited thereto. In some examples, the target beam selector block 453 may select a single target signal having a highest signal quality metric value (e.g., highest SNR value) and a single reference signal having a lowest signal quality metric value (e.g., lowest SNR value). In other examples, the target beam selector block 453 may select two or more target signals having highest signal quality metric values and/or may select two or more reference signals having lowest signal quality metric values, although the disclosure is not limited thereto.

While the examples illustrated above refer to the target beam selector block 453 selecting the target signal(s) and the reference signal(s) based on the highest/lowest signal quality metric values, the disclosure is not limited thereto and the target beam selector block 453 may select the target signal(s) and/or the reference signal(s) using any technique known to one of skill in the art. Thus, in some examples, the target signal(s) may omit a directional output associated with a high signal quality metric and/or include a directional output associated with an average signal quality metric without departing from the disclosure. Similarly, in some examples, the reference signal(s) may omit a directional output associated with a low signal quality metric and/or include a directional output associated with an average signal quality metric without departing from the disclosure. Additionally or alternatively, the target beam selector block 453 may include a deep neural network (DNN) (e.g., a first model) or other component that is configured to select the target signal(s) and the reference signal(s) without departing from the disclosure.

The target beam selector block 453 may pass the selected signals to the ARA block 454 for further processing. The ARA block 454 may perform adaptive reference canceling to improve the quality of the audio data for use by the downstream processes 460 by, for example, reducing or removing a long-term (e.g., lasting longer than one frame) acoustic interference signal. For example, the ARA block 454 may perform adaptive interference cancellation on the FBF outputs, using a first portion of the FBF outputs as the target signal(s) and a second portion of the FBF outputs as the reference signal(s). The ARA block 454 may generate an output signal by subtracting the reference signal(s) from the target signal(s). For example, the AIC component may generate the output signal by subtracting the second beamformed audio data associated with the reference beam(s) from the first beamformed audio data associated with the target beam(s). In other words, the ARA block 454 may subtract an audio signal received from one direction (e.g., from a source of acoustic interference) from an audio signal received from another direction (e.g., from a of a target audio signal such as a voice). Thus, the ARA block 454 may remove the reference signal(s) from the target signal(s) to generate output audio data. The output audio data may be a multi-channel, frequency-domain audio signal. The ARA block 454 may pass the output audio data to a beam merging block 455.

The beam merging block 455 may receive the multi-channel output audio data and generate single channel output audio data. For example, the beam merging block 455 may select directional audio data associated with a single direction from the output audio data received from the ARA block 454 and/or may generate a weighted sum that combines portions of the output audio data received from the ARA block 454 associated with two or more directions. The beam merging block 455 may pass the output audio data to the sub-band synthesis block 457.

The sub-band synthesis block 457 may convert the output audio data from the sub-band domain (e.g., the frequency domain) to the time domain using, for example, an inverse fast-Fourier transform (IFFT) algorithm. For example, the output audio data in the sub-band domain may include a plurality of separate sub-bands (e.g., individual frequency bands) and the sub-band synthesis may correspond to a filter bank that combines the plurality of sub-bands to generate the output signal in the time domain. The output audio data, now represented in the time domain, may be fed to an output gain block 458, which may normalize the output to, for example, stay within a specified amplitude range. The gain-adjusted, time-domain output audio data may then be send to downstream processes 460 on the second DSP core 430*b* or elsewhere. The DSP cores 430 and/or the CPU 470 may include additional time-domain and frequency-domain processing blocks connected in various arrangements. The number and arrangements of the processing blocks shown in FIG. 4 are given only as an example.

Figure 5:
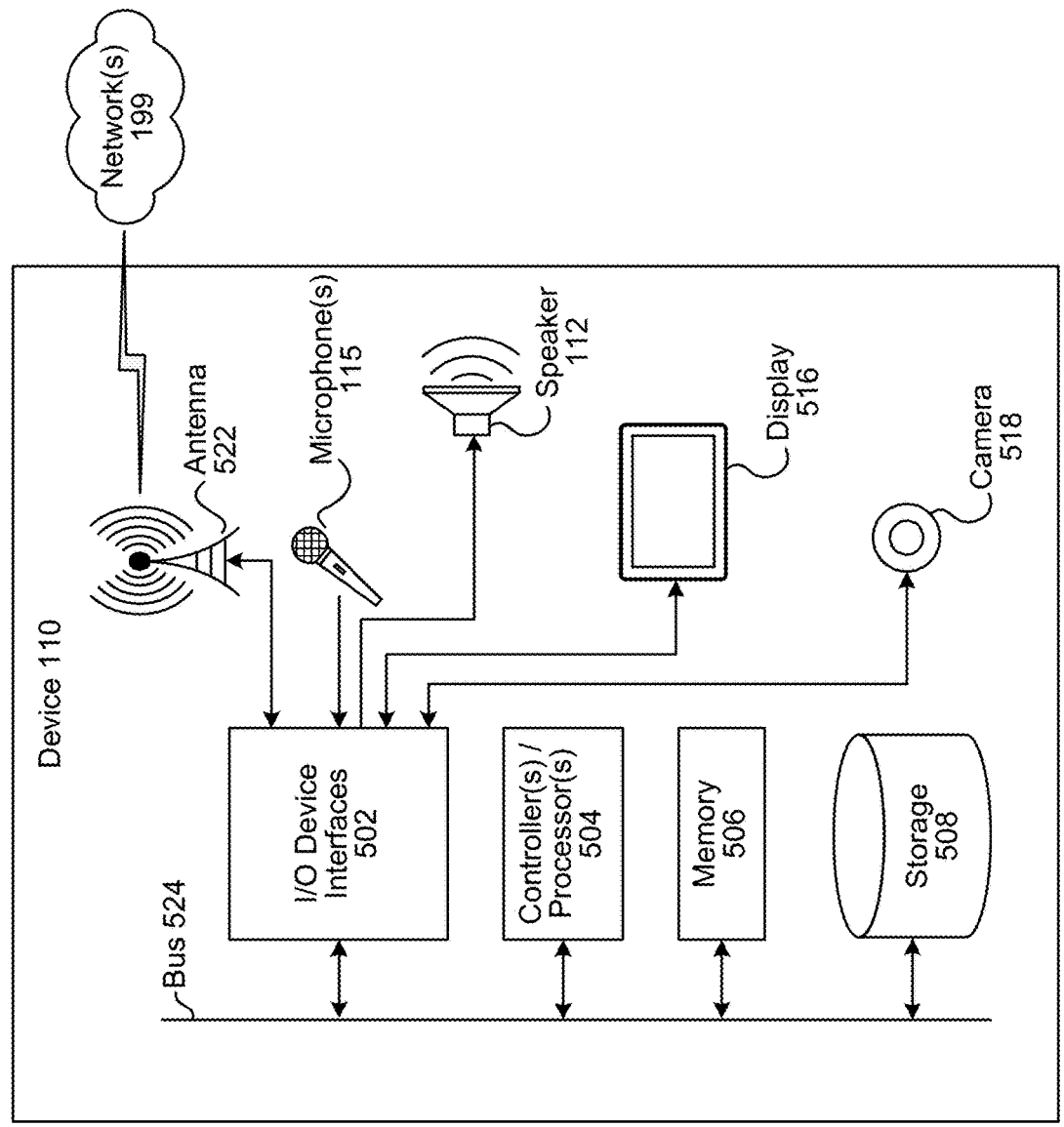
FIG. 5 is a block diagram conceptually illustrating example components of a device, according to embodiments of the present disclosure.
Figure 6:
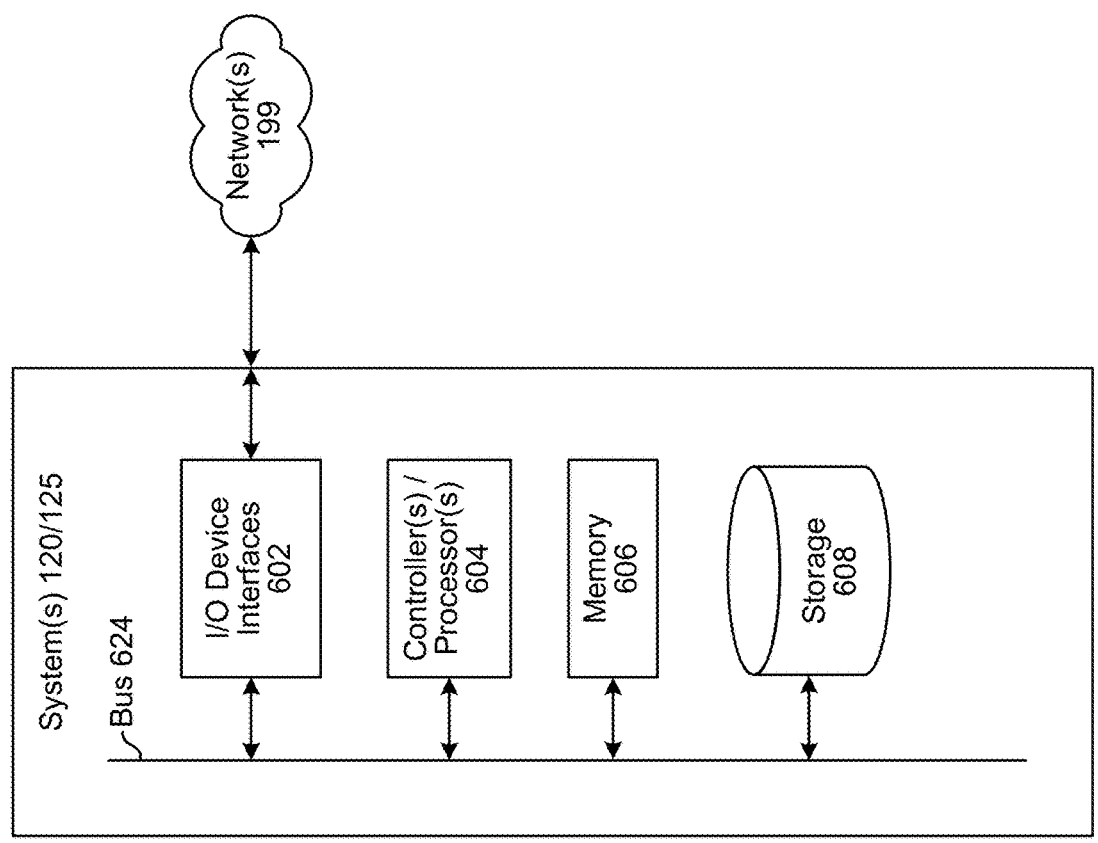
FIG. 6 is a block diagram conceptually illustrating example components of a system, according to embodiments of the present disclosure.

FIG. 5 is a block diagram conceptually illustrating a device 110 that may be used with the system. FIG. 6 is a block diagram conceptually illustrating example components of a remote device, such as the natural language command processing system 120, which may assist with ASR processing, natural langue understanding (NLU) processing, etc. A system 120 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems 120 may be included in the overall system 100 of the present disclosure, such as one or more natural language processing systems 120 for performing ASR processing, one or more natural language processing systems 120 for performing NLU processing, etc. In operation, each of these systems may include computer-readable and computer-executable instructions that reside on the respective system 120, as will be discussed further below.

Each of these devices (110/120) may include one or more controllers/processors (504/604), which may each include a central processing unit (CPU) for processing data and computer-readable instructions, and a memory (506/606) for storing data and instructions of the respective device. The memories (506/606) may individually include volatile random access memory (RAM), non-volatile read only memory (ROM), non-volatile magnetoresistive memory (MRAM), and/or other types of memory. Each device (110/120) may also include a data storage component (508/608) for storing data and controller/processor-executable instructions. Each data storage component (508/608) may individually include one or more non-volatile storage types such as magnetic storage, optical storage, solid-state storage, etc. Each device (110/120) may also be connected to removable or external non-volatile memory and/or storage (such as a removable memory card, memory key drive, networked storage, etc.) through respective input/output device interfaces (502/602).

Computer instructions for operating each device (110/120) and its various components may be executed by the respective device's controller(s)/processor(s) (504/604), using the memory (506/606) as temporary "working" storage at runtime. A device's computer instructions may be stored in a non-transitory manner in non-volatile memory (506/606), storage (508/608), or an external device(s). Alternatively, some or all of the executable instructions may be embedded in hardware or firmware on the respective device in addition to or instead of software.

Each device (110/120) includes input/output device interfaces (502/602). A variety of components may be connected through the input/output device interfaces (502/602), as will be discussed further below. Additionally, each device (110/120) may include an address/data bus (524/624) for conveying data among components of the respective device. Each component within a device (110/120) may also be directly connected to other components in addition to (or instead of) being connected to other components across the bus (524/624).

Referring to FIG. 5, the device 110 may include input/output device interfaces 502 that connect to a variety of components such as an audio output component such as a speaker 112, a wired headset or a wireless headset (not illustrated), or other component capable of outputting audio. The device 110 may also include an audio capture component. The audio capture component may be, for example, a microphone 115 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 516 for displaying content. The device 110 may further include a camera 518.

Via antenna(s) 522, the input/output device interfaces 502 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (502/602) may also include communication components that allow data to be exchanged between devices such as different physical servers in a collection of servers or other components.

The components of the device(s) 110, the natural language command processing system 120 may include their own dedicated processors, memory, and/or storage. Alternatively, one or more of the components of the device(s) 110, the natural language command processing system 120 may utilize the I/O interfaces (502/602), processor(s) (504/604), memory (506/606), and/or storage (508/608) of the device(s) 110 or the natural language command processing system 120. Thus, an ASR component may have its own I/O interface(s), processor(s), memory, and/or storage; an NLU component may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the natural language command processing system 120 as described herein, are illustrative, and may be located as a stand-alone device or may be included, in whole or in part, as a component of a larger device or system.

As illustrated in FIG. 7, multiple devices (110a-110n, 120) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a speech-detection device with display 110f, a display/smart television 110g, a washer/dryer 110h, a refrigerator 110i, a microwave 110j, and/or headless device(s) 110k (e.g., a device such as a FireTV stick, Echo Auto or the like) may be connected to the network(s) 199 through a wireless service provider, over a Wi-Fi_33 or cellular network connection, or the like. Other devices are included as network-connected support devices, such as the natural language command processing system 120 and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component, the NLU component, etc. of the natural language command processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method comprising:
   receiving, by a first processor, first time-domain data representing first audio detected by at least one microphone of a device;
   processing the first time-domain data to generate first frequency-domain data;

configuring a bit rate of a communication link between the first processor and a second processor based at least in part on a value associated with a communication mechanism of a digital signal processor (DSP) core;

generating, by the first processor using the first frequency-domain data and an output buffer size of the first processor, second frequency-domain data;

sending, from the first processor to a second processor, the second frequency-domain data;

generating, by the second processor using the second frequency-domain data, third frequency-domain data; and processing the third frequency-domain data to generate second time-domain data.

2. The method of claim 1, the method further comprising:
determining an input buffer size of the second processor;
configuring the output buffer size of the first processor equal to or greater than a size of the second frequency-domain data; and
configuring the input buffer size of the second processor to equal the output buffer size.

3. The method of claim 2, wherein configuring the output buffer size comprises:
configuring the output buffer size to equal a product of: a number of audio channels in the first time-domain data, a sample size of the first time-domain data, a sample rate of the first time-domain data, and a duration of the first time-domain data.

4. The method of claim 2, further comprising:
configuring the bit rate of the communication link between the first processor and the second processor equal to or greater than the output buffer size divided by a duration of the first time-domain data.

5. The method of claim 2, further comprising:
configuring the bit rate of the communication link between the first processor and the second processor equal to or greater than the output buffer size divided by a product of: a sample size of the first time-domain data, a number of audio channels in the first time-domain data, and a duration of the first time-domain data.

6. The method of claim 1, further comprising:
receiving, by the first processor, reference data representing second audio output by the device, wherein generating the second frequency-domain data includes performing audio echo cancelation (AEC) processing based in part on the reference data.

7. The method of claim 6, further comprising:
including, in the second frequency-domain data, an indication that the device is currently outputting second audio, wherein generating the third frequency-domain data is based in part on the indication.

8. The method of claim 1, wherein:
the first time-domain data includes a plurality of audio data channels corresponding to a plurality of microphones of the device; and
generating the third frequency-domain data includes performing beamforming based on the plurality of audio data channels.

9. The method of claim 1, wherein:
the first processor comprises a first digital signal processor (DSP) core; and
the second processor comprises a second DSP core.

10. The method of claim 1, wherein:
the first processor and the second processor communicate using an asynchronous inter-process communication mechanism.

11. A device, comprising:
at least a first processor and a second processor; and
at least one memory comprising instructions that, when executed by the first processor and the second processor, cause the device to:
receive, by the first processor, first time-domain data representing first audio detected by at least one microphone of a device;
process the first time-domain data to generate first frequency-domain data;
configure a bit rate of a communication link between the first processor and a second processor based at least in part on a value associated with a communication mechanism of a digital signal processor (DSP) core;
generate, by the first processor using the first frequency-domain data and an output buffer size of the first processor, second frequency-domain data;
send, from the first processor to a second processor, the second frequency-domain data;
generating, by the second processor using the second frequency-domain data, third frequency-domain data; and
process the third frequency-domain data to generate second time-domain data.

12. The device of claim 11, the at least one memory further comprises instructions that, when executed by the first processor and the second processor, further cause the device to:
determine an input buffer size of the second processor;
configure the output buffer size of the first processor equal to or greater than a size of the second frequency-domain data; and
configure the input buffer size of the second processor to equal the output buffer size.

13. The device of claim 12, the at least one memory further comprises instructions that, when executed by the first processor and the second processor, further cause the device to:
configure the output buffer size to equal a product of: a number of audio channels in the first time-domain data, a sample size of the first time-domain data, a sample rate of the first time-domain data, and a duration of the first time-domain data.

14. The device of claim 12, the at least one memory further comprises instructions that, when executed by the first processor and the second processor, further cause the device to:
configure the bit rate of the communication link between the first processor and the second processor equal to or greater than the output buffer size divided by a duration of the first time-domain data.

15. The device of claim 12, the at least one memory further comprises instructions that, when executed by the first processor and the second processor, further cause the device to:
configure the bit rate of the communication link between the first processor and the second processor to equal or greater than the output buffer size divided by a product of: a sample size of the first time-domain data, a number of audio channels in the first time-domain data, and a duration of the first time-domain data.

16. The device of claim 11, the at least one memory further comprises instructions that, when executed by the first processor and the second processor, further cause the device to:

receive, by the first processor, reference data representing second audio output by the device, wherein generating the second frequency-domain data includes performing audio echo cancelation (AEC) processing based in part on the reference data.

17. The device of claim 16, the at least one memory further comprises instructions that, when executed by the first processor and the second processor, further cause the device to:
include, in the second frequency-domain data, an indication that the device is currently outputting second audio; and
generate the third frequency-domain data based in part on the indication.

18. The device of claim 11, wherein:
the first time-domain data includes a plurality of audio data channels corresponding to a plurality of microphones of the device, and the at least one memory further comprises instructions that, when executed by the first processor and the second processor, further cause the device to:
perform, by the second processor, beamforming based on the plurality of audio data channels to generate the third frequency-domain data.

19. The device of claim 11, wherein:
the first processor having a first digital signal processor (DSP) core; and
the second processor having a second DSP core.

20. The device of claim 11, wherein:
the first processor and the second processor communicate using an asynchronous inter-process communication mechanism.

21. The method of claim 1, wherein:
the second frequency-domain data is sent from the first processor to the second processor using the communication link and the bit rate.

22. The device of claim 11, wherein:
the second frequency-domain data is sent from the first processor to the second processor using the communication link and the bit rate.

* * * * *